United States Patent
Nguyen et al.

(10) Patent No.: US 11,351,996 B2
(45) Date of Patent: Jun. 7, 2022

(54) TRAJECTORY PREDICTION OF SURROUNDING VEHICLES USING PREDEFINED ROUTES

(71) Applicant: DENSO International America, Inc., Southfield, MI (US)

(72) Inventors: Trong-Duy Nguyen, Southfield, MI (US); Hiroshi Inou, West Bloomfield, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 190 days.

(21) Appl. No.: 16/672,014

(22) Filed: Nov. 1, 2019

(65) Prior Publication Data

US 2021/0129836 A1    May 6, 2021

(51) Int. Cl.
| | |
|---|---|
| *B60W 30/095* | (2012.01) |
| *G06K 9/00* | (2022.01) |
| *G06K 9/62* | (2022.01) |
| *G08G 1/16* | (2006.01) |
| *G06V 20/58* | (2022.01) |

(52) U.S. Cl.
CPC ....... *B60W 30/0956* (2013.01); *G06K 9/6278* (2013.01); *G06V 20/584* (2022.01); *G08G 1/166* (2013.01); *B60W 2554/80* (2020.02)

(58) Field of Classification Search
CPC . B60W 30/095; G06V 20/584; G06K 9/6278; G08G 1/166
See application file for complete search history.

(56) References Cited

U.S. PATENT DOCUMENTS

| | | | |
|---|---|---|---|
| 8,437,890 | B2 | 5/2013 | Anderson et al. |
| 9,229,453 | B1 | 1/2016 | Lee |
| 10,671,076 | B1* | 6/2020 | Kobilarov ............ G05D 1/0255 |
| 2018/0154939 | A1* | 6/2018 | Aoki .................... B62D 15/025 |
| 2018/0284785 | A1 | 10/2018 | Berntorp et al. |
| 2019/0049968 | A1 | 2/2019 | Dean et al. |
| 2019/0049970 | A1 | 2/2019 | Djuric et al. |
| 2019/0049987 | A1 | 2/2019 | Djuric et al. |
| 2020/0018609 | A1* | 1/2020 | Nagy .................. G01C 21/3415 |
| 2020/0174471 | A1* | 6/2020 | Du ........................ G08G 1/0129 |
| 2020/0225669 | A1* | 7/2020 | Silva ................. B60W 60/0015 |

(Continued)

FOREIGN PATENT DOCUMENTS

CN    108803617    11/2018

*Primary Examiner* — Peter D Nolan
*Assistant Examiner* — Demetra R Smith-Stewart
(74) *Attorney, Agent, or Firm* — Burris Law, PLLC

(57) ABSTRACT

A method includes identifying a surrounding vehicle about a subject vehicle, obtaining a state characteristic for the surrounding vehicle, and selecting at least one potential route for the surrounding vehicle. The potential route is selected from among a plurality of routes that are predefined. The method further includes recurrently performing a prediction analysis to acquire at least one future trajectory for the at least one potential route and a mathematical state analysis to calculate a future state characteristic for the surrounding vehicle based on the future trajectory. The prediction analysis is based on a neural network and the future trajectory is determined based on the state characteristic of the surrounding vehicle and a subsequent future travel trajectory is predicted based on the calculated future state characteristic.

20 Claims, 10 Drawing Sheets

(56) References Cited

U.S. PATENT DOCUMENTS

| | | | |
|---|---|---|---|
| 2020/0232806 A1* | 7/2020 | Goldman | G01C 21/32 |
| 2020/0409352 A1* | 12/2020 | Caldwell | G05D 1/027 |
| 2021/0046924 A1* | 2/2021 | Caldwell | B60W 60/0011 |
| 2021/0149404 A1* | 5/2021 | Zeng | G05D 1/0274 |

* cited by examiner

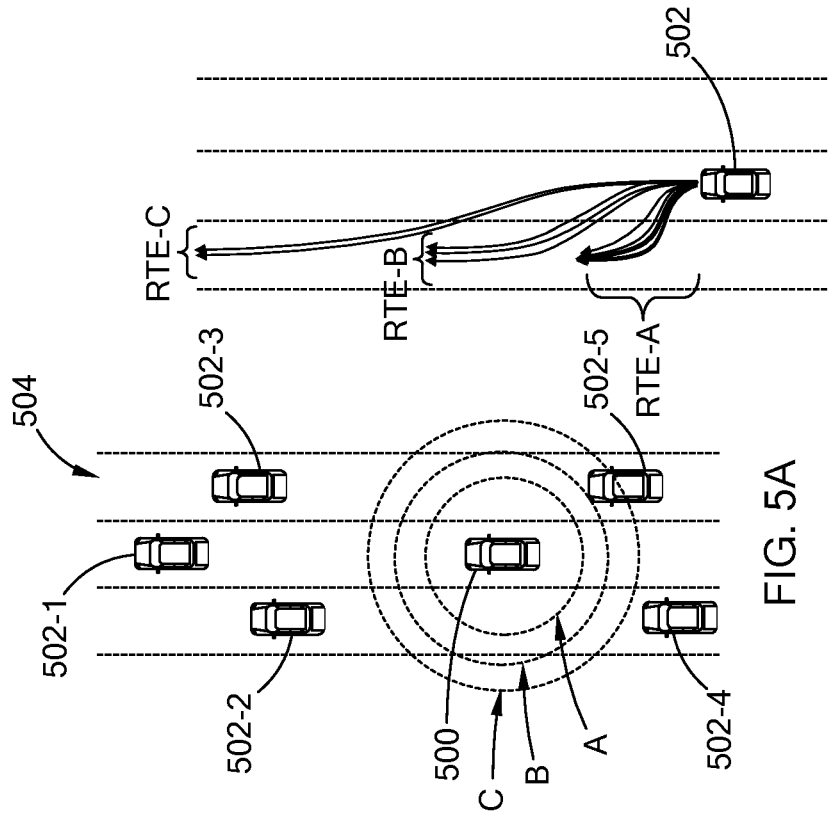
FIG. 4
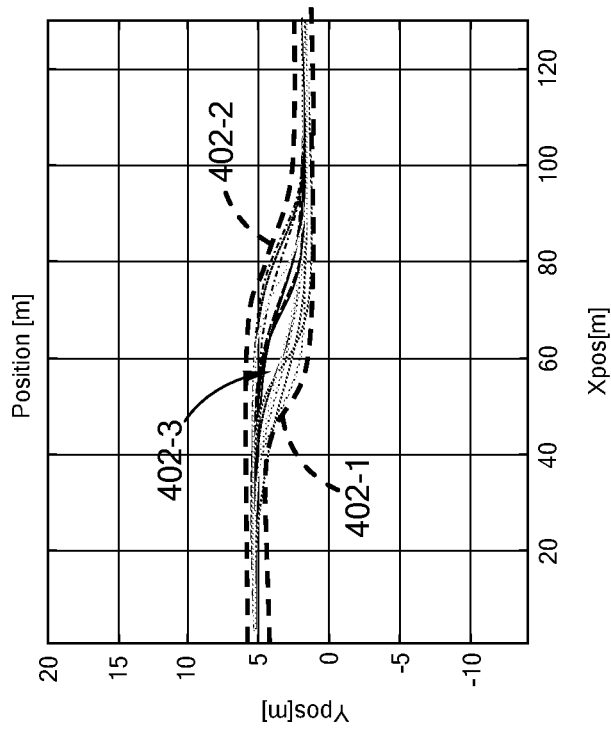
FIG. 5A
FIG. 5B

TRAJECTORY PREDICTION OF SURROUNDING VEHICLES USING PREDEFINED ROUTES

FIELD

The present disclosure relates to predicting a trajectory of a moving object such as a surrounding vehicle, traveling about a subject vehicle.

BACKGROUND

The statements in this section merely provide background information related to the present disclosure and may not constitute prior art.

Autonomous vehicles are typically capable of predicting a trajectory of a moving object provided about the autonomous vehicle to provide a travel plan for the autonomous vehicle. Now, to perform a continuous path planning, the movement of the moving object should be predicted in a continuous manner which can consume a lot of processing time and power. Furthermore, while efforts have been made to improve the prediction accuracy, traditional deterministic prediction may not be enough to provide a safe travel plan for the autonomous vehicle along a public road. That is, in reality the autonomous vehicles interact with human-driven vehicles and pedestrians and the autonomous vehicle may not able to obtain information regarding their travel plan. That is, even when faced with the same scenario at the same location, human decisions and actions may still vary from one another.

SUMMARY

This section provides a general summary of the disclosure and is not a comprehensive disclosure of its full scope or all of its features.

In one the present disclosure is directed toward a method that includes: identifying a surrounding vehicle about a subject vehicle; obtaining a state characteristic for the surrounding vehicle; selecting at least one potential route for the surrounding vehicle, where the at least one potential route is selected from among a plurality of routes that are predefined; and recurrently performing a prediction analysis to acquire at least one future trajectory for the at least one potential route and a mathematical state analysis to calculate a future state characteristic for the surrounding vehicle based on the at least one future trajectory. The prediction analysis is based on a neural network and the at least one future trajectory for the at least one potential route is determined based on the state characteristic of the surrounding vehicle. A subsequent future travel trajectory for the at least one potential route is predicted based on the calculated future state characteristic.

In another form, the present disclosure is directed toward a controller that includes one or more memory storing a route repository that stores a plurality of predefined routes and includes one or more microprocessors configured to execute computer readable instructions to operate as an object analysis module, a route module, and a route prediction module. The object analysis module is configured to detect and classify a surrounding vehicle about a subject vehicle and to acquire a state characteristic of the surrounding vehicle in response to the surrounding vehicle being classified. The route module is configured to select at least one potential route for the surrounding vehicle. The potential route is selected from among the plurality of predefined route. The route prediction module is configured to recurrently perform a prediction analysis to acquire at least one future trajectory for the at least one potential route and a mathematical state analysis to calculate a future state characteristic for the surrounding vehicle based on the at least one future trajectory. The prediction analysis is based on a neural network and the at least one future trajectory is determined based on the state characteristic of the surrounding vehicle, and a subsequent future travel trajectory is predicted based on the calculated future state characteristic.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 illustrates possible right lane changes as travel routes for a moving object in accordance with the present disclosure;

FIGS. 5A and 5B illustrate potential travels routes for the surrounding vehicle based on a distance between the subject vehicle and the surrounding vehicle in accordance with the present disclosure;

Figure 1:
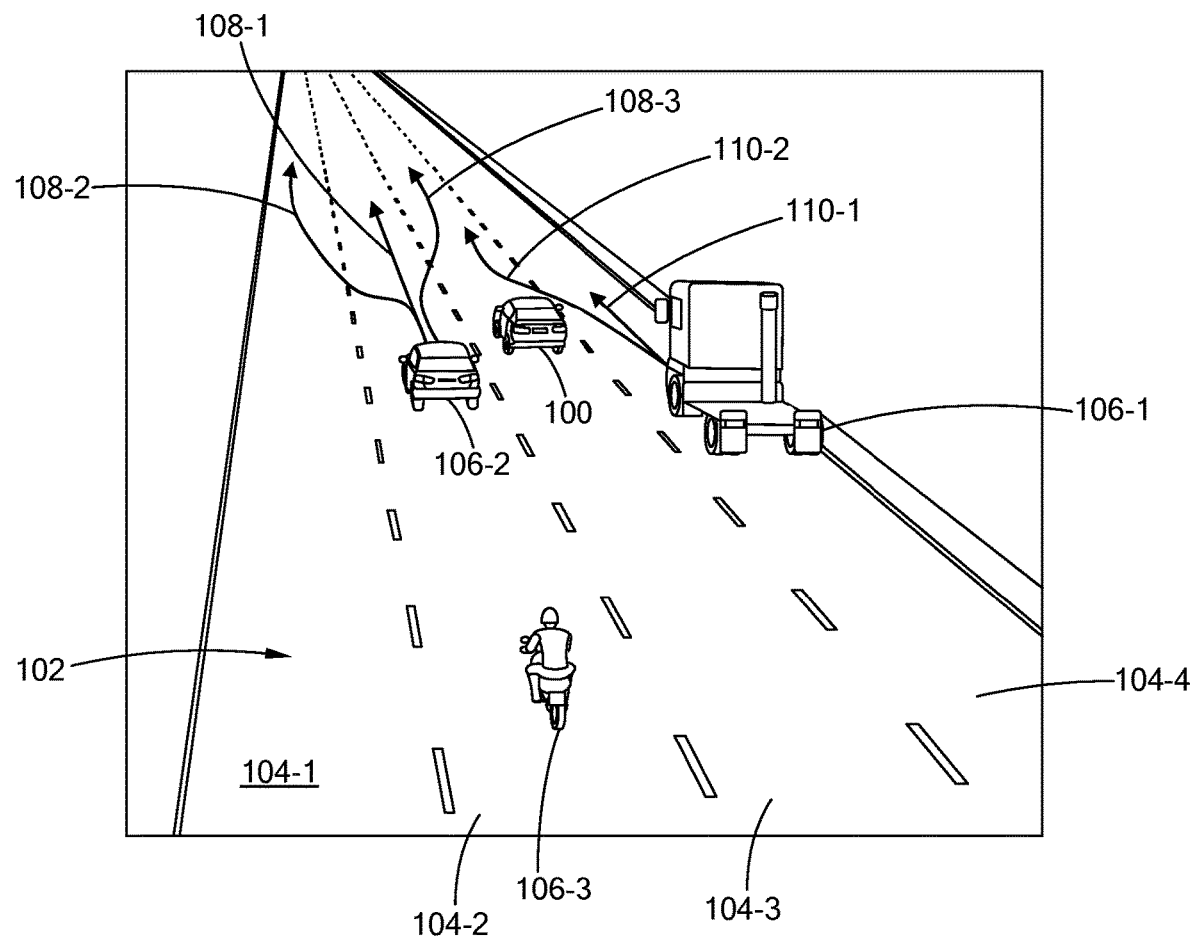
FIG. 1 illustrates a subject vehicle traveling along a road with multiple surrounding vehicles.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For predicting the motion of a moving object, such as a surrounding vehicle, mathematical models have been used to predict the likely evolution of the current traffic situation. Mathematical models usually use dynamic and kinematic models to anticipate the propagation of the situation, such as a state of the moving object. Because mathematical models tend to focus on the motion properties, the model-based approaches can provide short-term motion prediction, but are typically not applied to predict variations in the moving object's motion caused by special maneuvers such as various acceleration, various speed, slow down then speed up to overtake, etc. In addition, when a human drives the surrounding vehicle, he/she can continuously observe surrounding traffic motion. Then based on the historical motions of other vehicles, the human driver can predict the movement of surrounding traffic and can make proper maneuvers for his/her car.

In artificial intelligence (AI) based methods, the motion patterns are usually learned from data in a training process. Then in real-time of vehicle operation, an output of future positions of the moving object is derived from the trained machine learned model. However, the above-mentioned AI model generally require tremendous amount of computational cost and may overlook the merits given by physics-based approach.

The present disclosure is directed toward an object trajectory module that is configured to combine the mathematical model and AI-based methods for determining a trajectory of a moving object into a recurrent model. The module selects pre-defined routes based on state characteristics of a classified object and the routes can vary depending on the specific applications, such as vehicle motion prediction on the highway, vehicle motion prediction at intersections in urban areas, pedestrian motions, etc. The AI-model is then trained for predefined routes to reduce the computational cost during training process. The trained AI-model is used to predict the action of the classified object at time step k using the predefined routes. The predicted action and travel plans for the subject vehicle are provided to the mathematical model to obtain state characteristics of a surrounding vehicle for step time k+1, and the predicted state characteristics are provided to the AI-model for predicting a trajectory for step time k+1. Repeating the same process, the object trajectory module can predict the trajectory of the classified object for a continuous time period.

Referring to FIG. 1, a subject vehicle 100 is driving along a road 102 having four lanes 104-1 to 104-4 ("lanes 104," collectively) with three surrounding vehicles 106-1 to 106-3 ("surrounding vehicles 106," collectively). The subject vehicle 100 is provide as a fully autonomous vehicle in which a user may enter a destination and a vehicle control system drives the subject vehicle 100 to the destination based on a defined travel route with little to no input from the driver. For example, the subject vehicle 100 may include an interface operable by the driver to initiate an autonomous drive mode or the subject vehicle 100 may automatically drive in the autonomous mode. The surrounding vehicles 106 may be fully autonomous vehicles: semi-autonomous vehicles that have some level of automation such as, but not limited to, collision avoidance, lane control, lane change assist, and/or self-parking: and/or manually operated vehicles with no automation.

Figure 2:
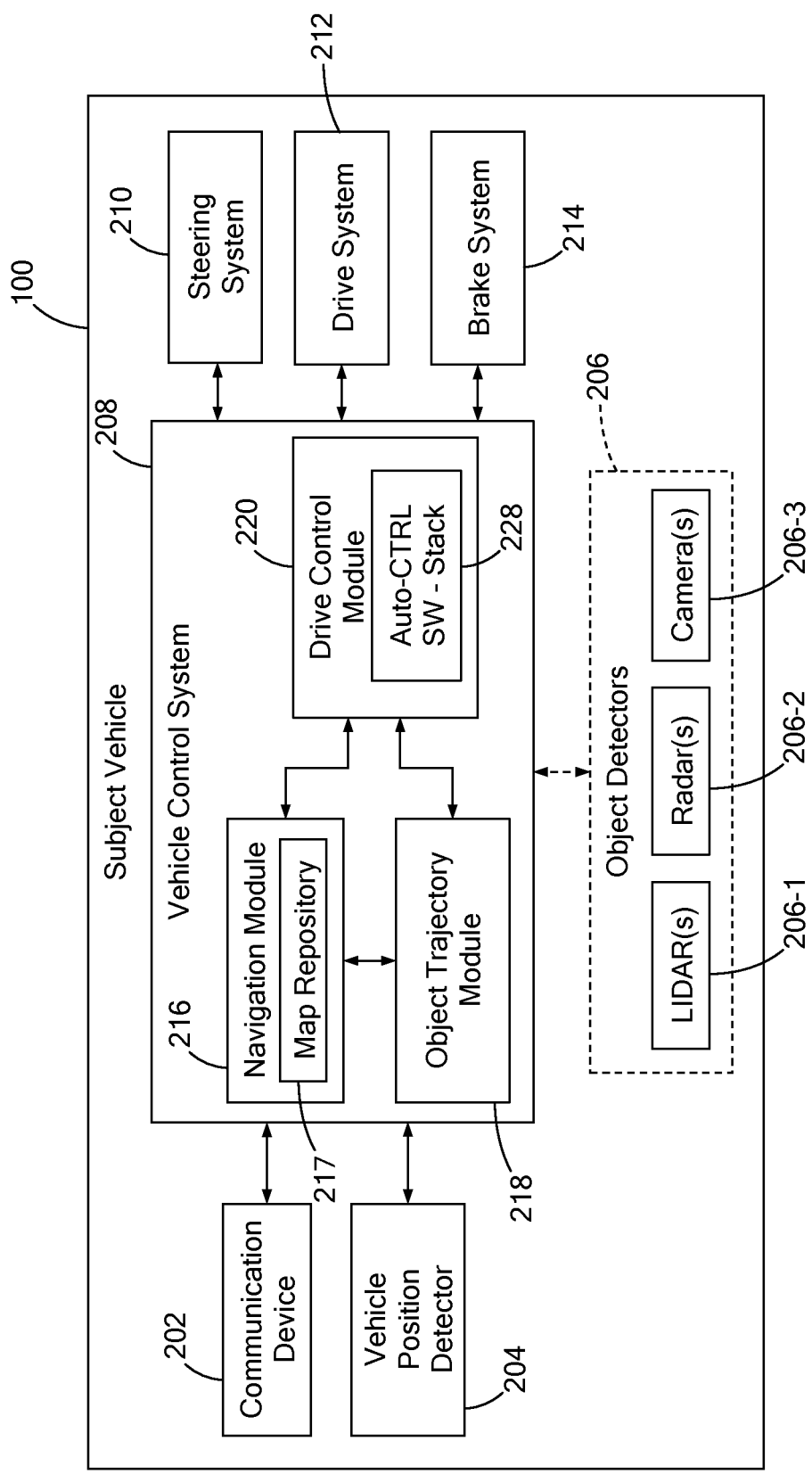
FIG. 2 is a block diagram of the subject vehicle which includes an object trajectory module in accordance with the present disclosure.

Referring to FIG. 2, an exemplary block diagram of the subject vehicle 100 is provided. In one form, the subject vehicle 100 includes a communication device 202, a vehicle position detector 204, one or more object detectors 206 arranged about the subject vehicle 100, and a vehicle control system 208. The devices and systems within the vehicle 100 may communicate with each other by way of a vehicular communication network (not shown) such as, but not limited to, a controller area network (i.e., CAN bus) or local interconnect network (LIN). It should be readily understood that while specific components/subsystems are identified, the subject vehicle 100 may include other components/subsystems. For example, the subject vehicle 100 may include human machine interfaces (HMI) such as monitors, audio systems, and/or input devices for communicating with passengers. In another example, the subject vehicle 100 includes a climate control system for controlling the environment within a passenger cabin of the subject vehicle 100.

The communication device 202 is configured to establish wireless communication with external devices/systems as part of a vehicle-to-everything (V2X) communication network which includes, for example, vehicle-to-vehicle, vehicle-to-infrastructure, and/or vehicle-to-node communication. In one form, the communication device 202 includes a transceiver and a computing device having a microprocessor and a memory for storing computer programs executable by the microprocessor to have the communication device 202 perform the operations described herein. The communication device 202 processes messages received and forwards the received message to a component within the subject vehicle 100 by way of the vehicle communication network. The communication device 202 also receives data transmission requests from other components within the subject vehicle 100 to generate and transmit messages to an external device having a communication device/system such as a communication device in the surrounding vehicle 104, if applicable. For example, the communication device 202 may receive a basic safety message from the surrounding vehicles 106 and transmit a basic safety message for the subject vehicle 100. The basic safety message may include a position, a travel direction, and/or a speed of a given vehicle.

The vehicle position detector 204 is configured to determine the location of the subject vehicle 100 and may include a global positioning system (GPS) antenna. In one form, the vehicle control system 208 uses the location to retrieve a detailed map of an area that the subject vehicle 100 is traveling in to determine one or more road characteristics such as the number of lanes, pedestrian crosswalks, traffic control devices (e.g., traffic lights, crosswalk lights), and/or traffic signage (e.g., stop signs, yield signs, one way, etc.).

The object detectors 206 are arranged along the subject vehicle 100 and are configured to detect objects about the vehicle 100, which include stationary and moving objects. For example, the object detectors 206 are operable to detect other vehicles, pedestrians, traffic signals, lane markings, traffic signs, vegetation, and road barriers, among others. In one form, the object detectors 206 may include a LIDAR(s) 206-1, a radar(s) 206-2, a camera(s) 206-3, and/or a combination thereof. It should be readily understood that other suitable object detectors may also be used and should not be limited to the examples provided herein.

The vehicle control system 208 controls the drive operation of the vehicle 100 by operating different subsystems within the subject vehicle 100 such as, but not limited to, a steering system 210, a drive system 212, and a brake system 214. The steering system 210 includes a series of components such as a steering wheel, steering angle sensors, and powered steering gears, for moving the subject vehicle 100 based on a rotation of the steering wheel provided by a driver. The drive system 212 is configured to generate and deliver power to the wheels of the subject vehicle 100 to move the subject vehicle 100. Based on the type of subject vehicle 100, the drive system 212 includes components such as, but not limited to, engine, transmission, battery system, electric motors, wheels, suspension, converter/generator, actuators, and/or sensors for detecting speed/velocity, wheel angle, and vehicle heading. The brake system 214 is operable to slow the subject vehicle 100 based on a control command from the vehicle control system 208 and/or an input from the driver. Based on the type of brake system (e.g., regenerative, hydraulic, etc.), the brake system 214 may include components such as, but not limited to, pedal, brakes, disc, and/or brake controllers. While specific subsystems are illustrated, the vehicle control system 208 may control other subsystems to perform various operations. For example, the vehicle control system 208 controls a climate control system that includes heat exchangers, a compressor, air-ducts, fans, and/or other components for controlling the environment within the passenger cabin.

In one form, the vehicle control system 208 includes a navigation module 216 having a map repository 217, an object trajectory module 218, and a drive control module 220. The vehicle control system 208 may include one or more controllers that are configured as the navigation module 216, the object trajectory module 218, and the drive control module 220. The one or more controllers may include a microprocessor, a memory for storing code executed by the processor circuit, and other suitable hardware components to provide the described functionality of the navigation module 216, the object trajectory module 218, and the drive control module 220. While specific modules are illustrated, the vehicle control system 208 may include other modules for controlling components within the subject vehicle 100 such as a climate control module for controlling the climate control system, and should not be limited to the modules described herein.

The navigation module 216 is configured to determine travel routes to a destination based on a current location of the subject vehicle 100 and maps provided in the map repository 217. In one form, the map repository 217 stores various navigational maps that illustrate roads, traffic intersections, transit routes, points of interest, and/or other suitable information.

The object trajectory module 218 of the present disclosure is configured to predict a trajectory of one or more moving objects about the subject vehicle 100 using a neural network and a mathematical model. The neural network predicts a future travel trajectory of the moving object using predefined travel routes and the mathematical model estimates future state characteristics of the moving object at the future travel trajectory. The neural network and the mathematical model are interconnected with one another such that the neural network uses the future state characteristics from the mathematical model to predict the future travel trajectory and the mathematical model uses the future travel trajectory to determine the future state characteristics. This process is continuously performed until, for example, the subject vehicle 100 is turned off or reaches its destination, or an autonomous setting is deactivated. Accordingly, the object trajectory module 218 is able to predict future trajectories and future state characteristics for some time in the future (i.e., horizon). Details regarding the object trajectory module 218 are provided below.

The drive control module 220 is configured to control various vehicle subsystems to autonomously drive the subject vehicle 100. In one form, the drive control module 220 includes an autonomous control software stack 228 ("Auto-CTRL-SW-Stack" in FIG. 2) that, when executed by a processor, provides control commands to the vehicle subsystems such as the drive system 212 and/or the brake system 214. The autonomous control software stack 228 includes various software applications for performing various driving maneuvers such as adjusting the speed of the vehicle, altering travel direction, changing lanes, avoiding objects, joining platoons, and/or other suitable actions. As part of its autonomous control, the drive control module 220 formulates a travel plan for the subject vehicle 100 and controls movement of the subject vehicle 100 based on the moving object(s) about the subject vehicle 100. In one form, the drive control module 220 receives information regarding predicted movement of a detected object from the object trajectory module 218, and uses the information to determine the travel plan. As an example, if a moving object is a surrounding vehicle that is predicted to move in front of the subject vehicle 100, the travel plan may have the subject vehicle slow down.

Figure 3:
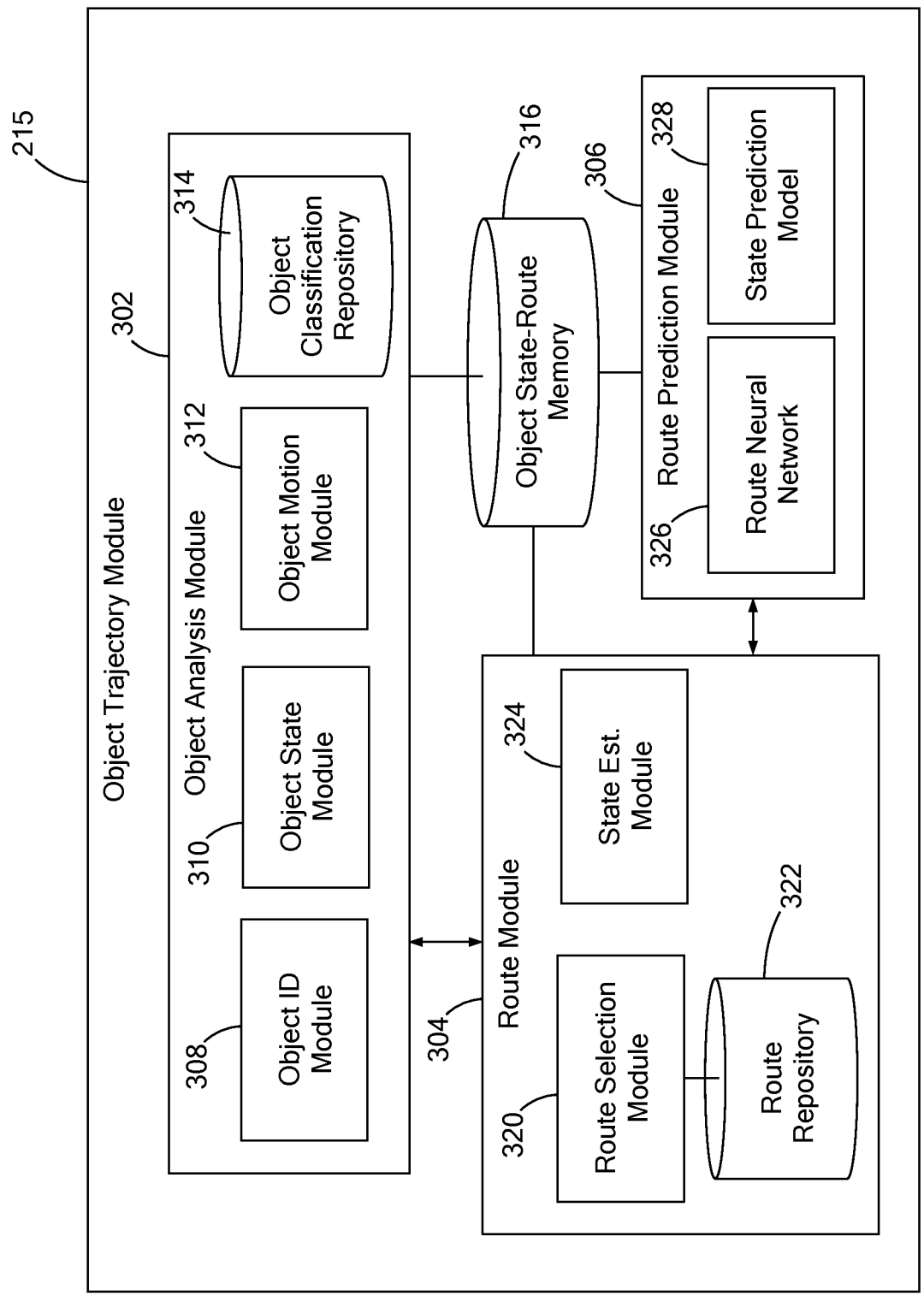
FIG. 3 is a block diagram of the object trajectory module in accordance with the present disclosure.

Referring to FIG. 3, an exemplary block diagram of an object trajectory module 218 is provided. In one form, the object trajectory module 218 includes an object analysis module 302, a route module 304, and a route prediction module 306. The object analysis module 302 is configured to detect, classify, and track objects and, more particularly, moving objects, about the subject vehicle 100. The route module 304 is configured to select one or more predefined routes for a classified object and estimate state characteristics for the selected routes based on measured state characteristics for the classified objects. The route prediction module 306 is configured to predict a future travel route for the classified object based on the state characteristics (e.g., measured and estimated) and the selected predefined routes.

In one form, the object analysis module 302 includes an object identification (ID) module 308, an object state module 310, an object motion module 312, and an object classification repository 314. The object identification module 308 detects one or more objects about the subject vehicle 100 and classifies the type of object detected based on data from the object detectors 206 and the object classification repository 314. For example, using known object recognition software, the object identification module 308 detects an object in the image(s) from the camera(s) 206-3 and then identifies or, in other words, classifies the detected objects using the data stored in the object classification repository 314. Specifically, the object classification repository 314 includes a library of preidentified objects that are assigned a classification, such as vehicles, pedestrians, animals, buildings, etc. In one form, the object classification repository 314 includes one or more images of different types of vehicles (e.g., trucks, motorcycles, four wheel passenger vehicles, buses) and may associate the images with a general classification of "vehicle." Similarly, the object classification repository 314 stores various images of pedestrians (e.g., a pedestrian walking, standing, and/or on a bicycle) and may associate the images with a general classification of "pedestrian." In one form, if an object cannot be identified, it is classified as an unidentifiable object.

In addition to data from the object detector 206, the object identification module 308 may identify objects based on messages from external devices that the subject vehicle 100 is in communication with. For example, by way of V2X communication, the subject vehicle 100 receives basic safety messages that provide vehicle ID and position of surrounding vehicles 106. Using this information, the object identification module 308 may identify and classify objects such as the surrounding vehicles 106.

The object state module 310 is configured to determine one or more state characteristics of the classified object(s). The state characteristics includes, but is not limited to, the position, speed, acceleration, distance, and/or travel direction of the classified object. In one form, the object state module 310 determines the state characteristics based on data from the object detectors 206. For example, the radar 206-2 emits a signal having predefined properties (e.g., frequency, waveform, amplitude, etc.), and receives a signal that is reflected off of an object, such as a surrounding vehicle 106. The object state module 310 is configured to analyze the signals transmitted and received using known signal analysis methods to determine, for example, a speed of the classified object, a distance between the subject vehicle and the classified object, and an acceleration of the classified object using multiple speed measurements. In one example analysis, the distance is determined based on the time it takes signal from the radar 206-2 to reflect back to the radar 206-2. In another example, the speed is determined using known algorithms in which the speed is dependent on the frequency of the transmitted signal, a difference between the frequency of the transmitted signal and the frequency of the received signal, and the speed of light. While specific examples are provided, the state characteristics may be determined using other algorithms/methods and/or using data from other object detectors 206 such as the LIDAR 206-1 and/or the camera 206-3.

In another form, the object state module 310 may also acquire state characteristics from the classified object(s) such as the basic safety messages from the surrounding vehicles 106. As provided above, the basic safety message provides a vehicle ID, speed, travel direction, and/or position to notify the other devices/vehicles of its presence. Accordingly, using data from various sources (e.g., object detectors 206, the surrounding vehicles 106, etc.), the object state module 310 is able to acquire the state characteristics of the classified objects.

Using the information from the object identification module 308 and the object state module 310, the object motion module 312 is configured to categorize a motion of the classified object (i.e. a motion category) and track the movement of the classified object(s). Specifically, the object motion module 312 reviews the state characteristics of a given surrounding vehicle 106 taken at two consecutive measurements to determine if the given surrounding vehicle 106 is classified as stationary, constant speed, acceleration, or deceleration. A similar classification can be provided for pedestrians in which state characteristics can be used to determine if the pedestrian is stationary, walking, running, or drifting. The object motion module 312 is further configured to store data regarding the classified objects sequential over time in an object state-route memory 316. In one form, the data stored for a given object includes the classification, the motion category, and/or one or more of the state characteristics. If the object is not detected at a measurement time, the object motion module 312 tracks the object based on the past data until the object is detected, after a predefined time has lapse, or other condition.

In one form, the route module 304 is configured to include a route selection module 320 that selects one or more potential routes from among a plurality of routes stored in a route repository 322, and a state estimation (Est.) module 324. In one form, the route selection module 320 is configured to select at least one potential route from among a plurality of predefined routes for the classified object based on the position of the classified object and a distance between the subject vehicle 100 and the classified object.

More particularly, referring to FIG. 1, each of the surrounding vehicles 106 can travel along a multitude of possible travel routes. For example, the surrounding vehicle 106-2 may travel along a straight travel route 108-1, a left travel route 108-2 to perform a left lane change from lane 104-2 to lane 104-1, or a right travel route 108-3 to perform a right lane change from lane 104-2 to lane 104-3. In another example, since the surrounding vehicle 106-1 is traveling in the right most lane, the surrounding vehicle 106-1 may travel along a straight travel route 110-1 or a left travel route 110-2 to perform a left lane change from lane 104-4 to lane 104-3.

The right and left lane changes may further encompass different trajectories based on how shallow or sharp the lane change might be. As an example, FIG. 4 illustrates possible right lane changes which include travel routes 402-1 and 402-2 and multiple other routes defined between the travel routes 402-1 and 402-2, which are generally identified by reference number 402-3. In this example, the route 402-1 is sharper than the route 402-2.

In one form, the number of potential travel routes is limited based on a distance between the subject vehicle 100 and a given surrounding vehicle 106. For example, FIG. 5A illustrates a subject vehicle 500 and multiple surrounding vehicles 502-1 to 502-5 traveling along a four-lane road 504 (collectively "surrounding vehicles 502"). The subject vehicle 500 is configured in a similar manner as the subject vehicle 100.

The subject vehicle 500 is further from the surrounding vehicle 502-3 than the surrounding vehicle 502-4. To make a left lane change, it is assumed that the surrounding vehicle 502-3 may make a shallower lane change than the surrounding vehicle 502-4. In addition, to provide smooth drive control and inhibit or mitigate collision, the subject vehicle 500 may anticipate a more aggressive maneuver by the surrounding vehicles 502 that are closest to it. Accordingly, the potential routes for a given surrounding vehicle 502 may be filtered by distance. That is, FIG. 5A illustrates a first area A, a second area B, and a third area C around the subject vehicle 500 and FIG. 5B illustrates predefined routes for a given surrounding vehicle 502 based on which area the given surrounding vehicle 502 is positioned in. Specifically, routes RTE-A are for the first area A, routes RTE-B are for the second area B, and routes RTE-C are for the third area C.

Figure 6A:
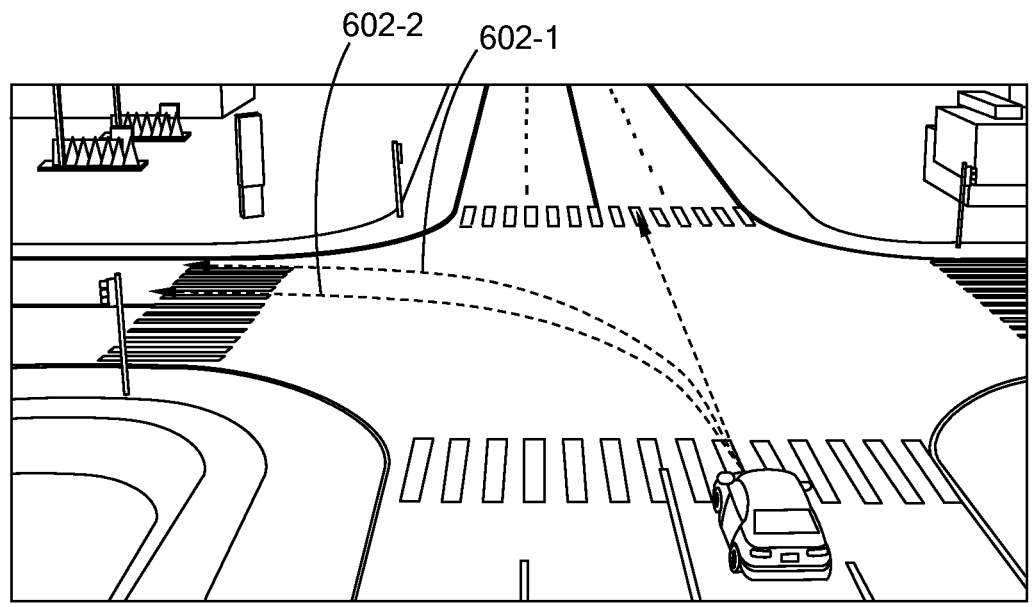
FIGS. 6A and 6B illustrate potential routes for a vehicle making a left turn and for pedestrians, respectively, in accordance with the present disclosure.
Figure 6B:
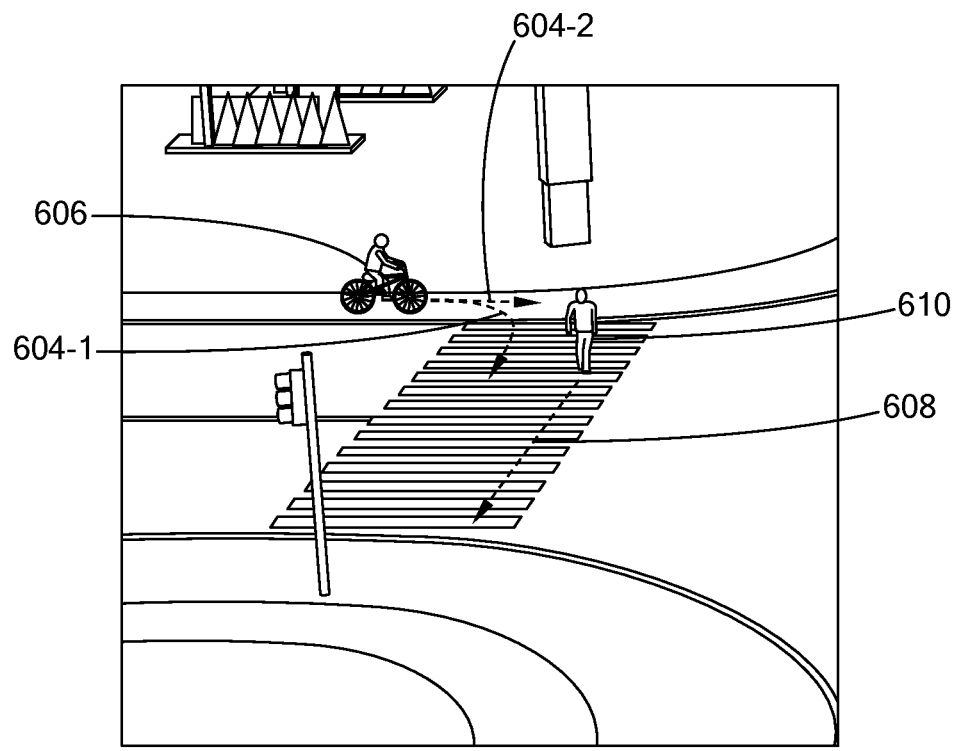

While specific examples are provided for right and left lane changes, predefined routes may also be provided for other trajectory modifications such as left turns, right turns, and routes for traversing a roundabout, among others. In addition, predefined routes may also be provided for non-vehicles such as pedestrians and animals. For example, FIG. 6A illustrates two predefined routes for a left turn (602-1 and 602-2) and FIG. 6B illustrates routes 604-1 and 604-2 for a pedestrian 606 and a route 608 for a pedestrian 610.

Figure 7B:
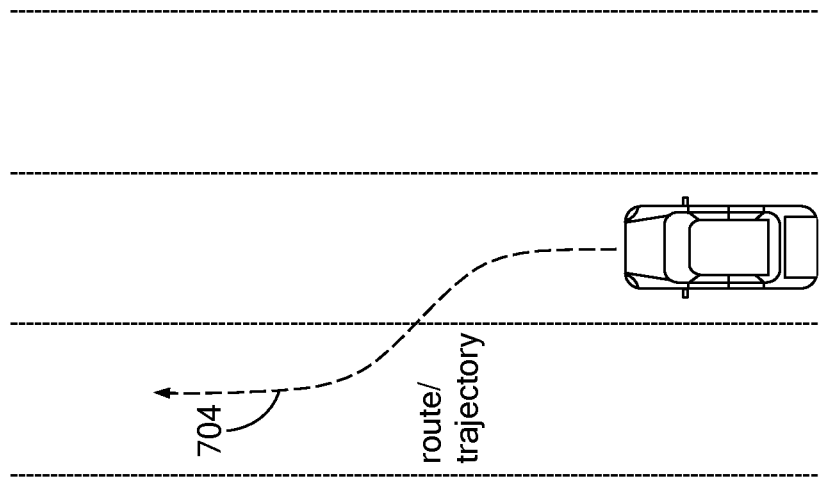
FIGS. 7A and 7B illustrate a travel route defined by two position points and a travel route defined by multiple position points, respectively, in accordance with the present disclosure.
Figure 7A:
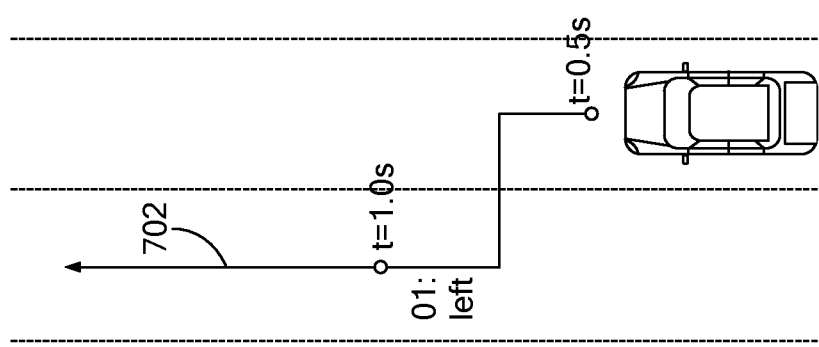

The predefined routes are configured to mimic human controlled maneuvers. For example, FIG. 7A illustrates a route 702 for a left lane change that is defined between two positions; a position at the current lane at time t=0 and a position at the left lane at time t=1. On the other hand, FIG. 7B illustrates a route 704 that includes more than two positions to provide a smooth continuous transition from the current travel lane to the left lane.

Accordingly, in one form, the route repository 322 stores data indicative of a plurality of predefined routes based on the classified objects. The route repository 322 may organize the routes based on the type of travel trajectory defined (e.g., straight, right lane change, left lane change, right turn, left turn, and roundabout, among others). In addition, the routes may be associated with classified objects (e.g., pedestrians may have different routes than that of vehicles), and/or with a distance setpoint.

The route selection module 320 is configured to select at least one potential route for the classified object based on the classification and, in some cases, a distance between the object and subject vehicle. In one form, the route selection module 320 determines which set of routes to select from based on data from the object analysis module 302, which provides the type of object and the distance of the object from the subject vehicle. To determine potential maneuvers of the classified object, the route selection module 320 may use data from the object detectors 206 to determine lane markings along the road and/or use a map from the map repository 217 of the area being traveled. For example, using known lane detection techniques, the route selection module 320 analyzes images from the camera(s) 206-3 to determine which lane the surrounding vehicles 106 are traveling along or to determine location of pedestrians with respect to the road and/or crosswalks. In another example, the route selection module 320 may acquire characteristics of the road such as number of lanes, travel direction, and traffic control devices (e.g., traffic lights and stop signs) from the navigation module 216. Accordingly, if the subject vehicle is at an intersection, the route selection module 320 is able to determine in which direction the surrounding vehicles may go.

The state estimation module 324 is configured to calculate state characteristics for each selected potential route for the classified object based on state characteristics of the classified object stored in the object state-route memory 316. In other words, the state estimation module 324 calculates the state characteristics relative to all of the selected potential routes to obtain estimated historical trajectories corresponding to the selected potential routes.

The route prediction module 306 is configured to predict a trajectory using the selected potential routes, thereby providing a pre-defined route-based trajectory prediction. More particularly, the route prediction module 306 utilizes an AI-model to predict a future trajectory and a mathematical model that determines a future state characteristic(s). The AI-model and the mathematical model are interconnected to form a recurrent neural network to provide continuous trajectory prediction. Accordingly, in one form, the route prediction module 306 includes a route neural network 326 (i.e., a prediction analysis) and a state prediction model 328 (i.e., a mathematical state analysis).

The route neural network 326 includes an AI-model that predicts a continuous future trajectory and determines a probability that the future trajectory would be taken. In one form, the AI-model is a Bayesian neural network and, more particularly, a Bayesian recurrent neural network (BRNN). In one form, a hierarchical framework based on BRNN for a driving scenario with N possible routes is provided in Equations 1 and 2, in which, "$rt_n$" is route n (n=1, 2, . . . , N), "prb" is probability, "x" is position, "k" is current data measurement, "p" is previous data measurement, and "h" is a data measurement in the future (e.g., 3 measurements in the future, 5 measurements in the future). In one form, the horizon is determined by the processing speed of the sensors and/or the controllers and can be controlled by the route prediction module 306 by adjusting how often the predictions are made.

$$(rt_n)_{n=1}^N, prb(x_{k+1:k+h} \mid x_{k-p:k}) = \sum_{n=1}^N prb(rt_n) prb(x_{k+1:k+h} \mid x_{k-p:k}, rt_n) \quad \text{Equation 1}$$

$$prb_{k \to 1}(rt_n) = \frac{prb(x_{k+1} \mid x_{k-p:k}, rt_n)^2 prb_k(rt_n)}{\sum_{n=1}^N prb(x_{k+1} \mid x_{k-p:k}, rt_n)^2 prb_k(rt_n)} \quad \text{Equation 2}$$

Figure 8:
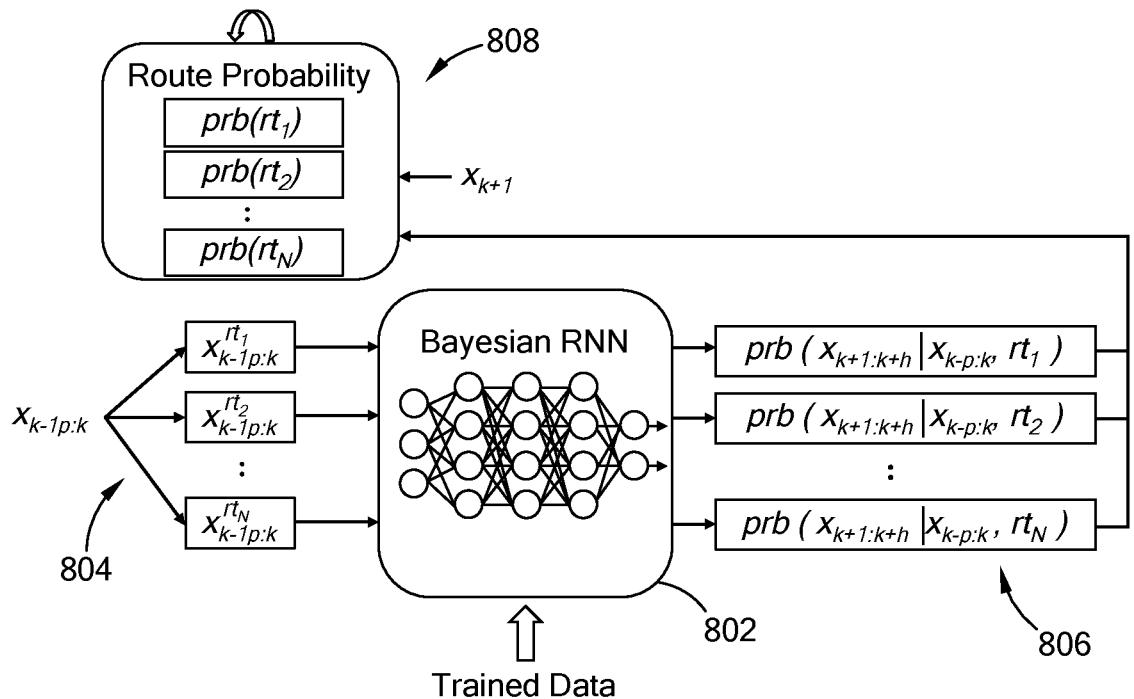
FIG. 8 is a functional diagram of a Bayesian recurrent neural network (BRNN) in accordance with the present disclosure.

Referring to FIG. 8, an exemplary functional diagram of the BRNN is provided. Here, a BRNN 802 (Bayesian RNN in FIG. 8) acquires state characteristics relative to a trajectory for each potential route from the state estimation module 324. The state characteristics is generally identified by reference number 804 in FIG. 8. In one form, the BRNN 802 approximates a conditional trajectory distribution for each potential route, which is provided as $prb(x_{k+1:k+h}/x_{k-p:k}, rt_n)$ and identified by reference number 806. Given current measured state characteristics of the classified object (e.g., a surrounding vehicle), a route probability ($prb(rt_n)$) is updated using Equation 2, and is provided as reference number 808. Intuitively, if the observation is more likely given a specific route based on the predicted distribution, then the BRNN assigns a higher probability for that route. While the state characteristics is shown as position measurements (i.e., x), the state characteristics may also be and/or include speed (v), acceleration (a), and/or jerk (j). In one form, jerk is defined as a derivative of acceleration versus time and can be expressed in both longitudinal and lateral directions. Accordingly, Equations 1 and 2 may be modified to represent v, a, and/or j.

Figure 9A:
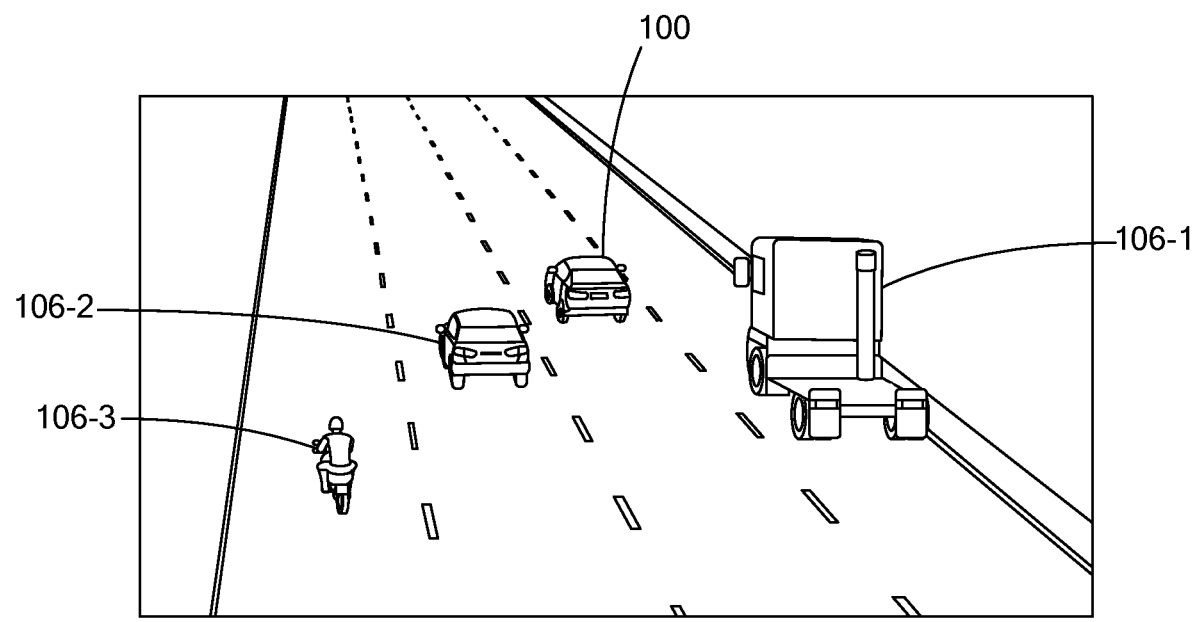
FIGS. 9A and 9B illustrate a surrounding vehicle during an occlusion in accordance with the present disclosure.
Figure 9B:
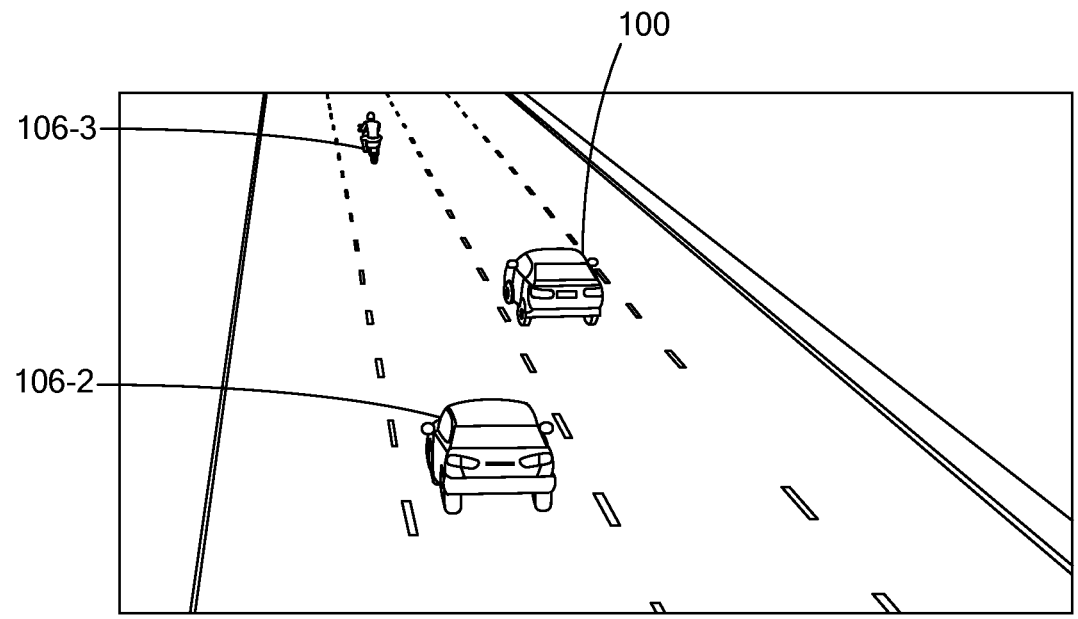

The BRNN is also configured to accommodate sensor occlusion in which a classified object is not detected by the subject vehicle 100. For example, in FIGS. 9A and 9B, the surrounding vehicle 106-3 may not be detected by the subject vehicle 100 because it is hidden by the surrounding vehicle 106-2. It is not until some time later that the surrounding vehicle 106-3 is detected as it moves away from the surrounding vehicle 106-2 and is within a detection range of the subject vehicle 100 (e.g., see FIG. 9B). During the time the surrounding vehicle 106-3 is undetectable, the BRNN 802 uses previous measured state characteristics to predict the future trajectory of the hidden surrounding vehicle 106-3. Once the surrounding vehicle 106-3 is detected, the BRNN uses the measured state characteristics. In one form, during the occlusion, the BRNN is configured to keep the route probability unchanged because the classified object is not detected. The BRNN may also extend its prediction for a longer horizon until occlusion ends.

The state prediction model 328 is configured to predict next state for each object which is used by the route neural network 326 to predict trajectory of the potential routes. In one form, the state prediction model 328 includes one or more mathematical models that can be used independently or in combination with other models. As an example, the following provides three different models that provide state space equations representing the driving environment in which Model A uses a constant velocity, Model B uses a constant acceleration, and Model C uses a constant jerk. Models A, B, and C can be applied separately or in combination to adapt with a classified objects movements to provide an accurate estimation of the object's trajectory.

Model A
$$x_c(k+1) = x_c(k) + v_c(k) \cdot \Delta k + w_0$$
$$v_c(k+1) = v_c(k) + w_1$$
$$a_c(k+1) = 0$$
$$j_c(k+1) = 0$$

$$x(k) = \begin{bmatrix} \text{position} \\ \text{velocity} \\ \text{acceleration} \\ \text{jerk} \end{bmatrix} = \begin{bmatrix} x_c(k) \\ v_c(k) \\ a_c(k) \\ j_c(k) \end{bmatrix}$$

Model B
$$x_c(k+1) = x_c(k) + v_c(k) \cdot \Delta k + w_0$$
$$v_c(k+1) = v_c(k) + a_c(k) \cdot \Delta k + w_1$$
$$a_c(k+1) = a_c(k) + w_2$$
$$j_c(k+1) = 0$$

Model C
$$x_c(k+1) = x_c(k) + v_c(k) \cdot \Delta k + w_0$$
$$v_c(k+1) = v_c(k) + a_c(k) \cdot \Delta k + w_1$$
$$a_c(k+1) = a_c(k) + j_c(k) \cdot \Delta k + w_2$$
$$j_c(k+1) = \frac{\{a_c(k) - a_c(k-1)\}}{2} + w_3$$

The state prediction model 328 receives the predicted future travel trajectory from the route neural network 326 for measurement k and acquires data from object state-route memory 316 regarding the classified object such as previously measured state characteristics and the motion category for the previous measurements. Using the motion category, the state prediction model 328 selects the appropriate mathematical model(s) for calculating a future state characteristic for a future measurement (e.g., state characteristics at k+1, k+2 . . . k+h). For example, if a surrounding vehicle, as a classified object, is traveling at a constant speed, Model A is selected. If the surrounding vehicle is at a constant speed at a measurement k−1 but accelerates at k, then a combination of Models A and B may be used.

To predict the state of the classified objects, the state prediction model 328 further considers the movement of the subject vehicle, which may affect the movement of the classified object. That is, with reference to FIG. 1, if the subject vehicle 100 plans to transition to the lane 104-2, the surrounding vehicle 106-2 may slow down (i.e., decelerate). Thus, to account for the subject vehicle's own movement, the state prediction model 328 receives a travel plan that includes state characteristics for the subject vehicle 100 from the drive control module 220. Accordingly, the state prediction model 328 calculates the future state characteristic based on the state models, the state characteristics of the subject vehicle, and previous state characteristics of the classified objects.

Figure 10:
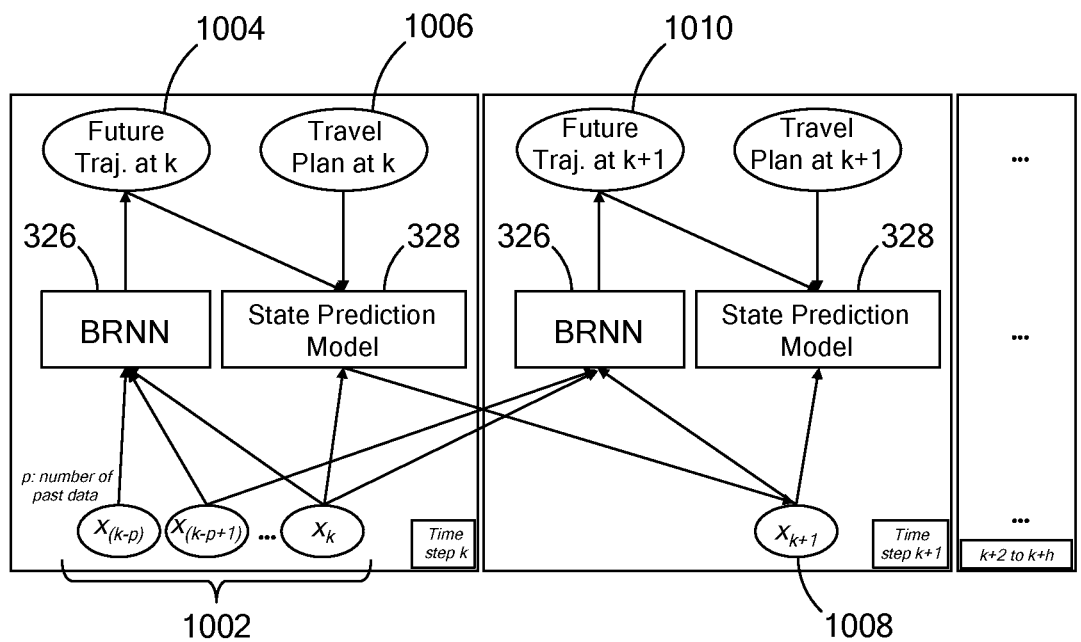
FIG. 10 is a block diagram illustrating an interconnect relationship between the BRNN and a state prediction model in accordance with the present disclosure.

Referring to FIG. 10, an example block diagram illustrating the interconnect relationship between the route neural network 326 and the state prediction model 328 is provided. At step k, the route neural network 326 acquires p number of past data which is referenced by reference number 1002 and predicts a future trajectory 1004 for at time k or in other words a measurement time k. The future trajectory is provided to the state prediction model 328, which also receives measured state characteristics and a travel plan 1006 for the subject vehicle 100 at measurement time k. Using the data and predefined model, the state prediction model 328 generates a future state characteristic for k+1 (i.e., $x_{k+1}$ 1008). At k+1, the route neural network 326 uses the future state characteristic to determine a future trajectory for k+1, which is referenced as 1010. This process continues until k+h (h is horizon or number of steps in prediction).

The future trajectory of the classified object is used by the drive control module 220 to control the movement of the subject vehicle. In one form, the drive control module 220 utilizes the future trajectory with the highest probability for its analysis and may also acquire the future trajectory for selected classified objects such as surrounding vehicles.

Figure 11:
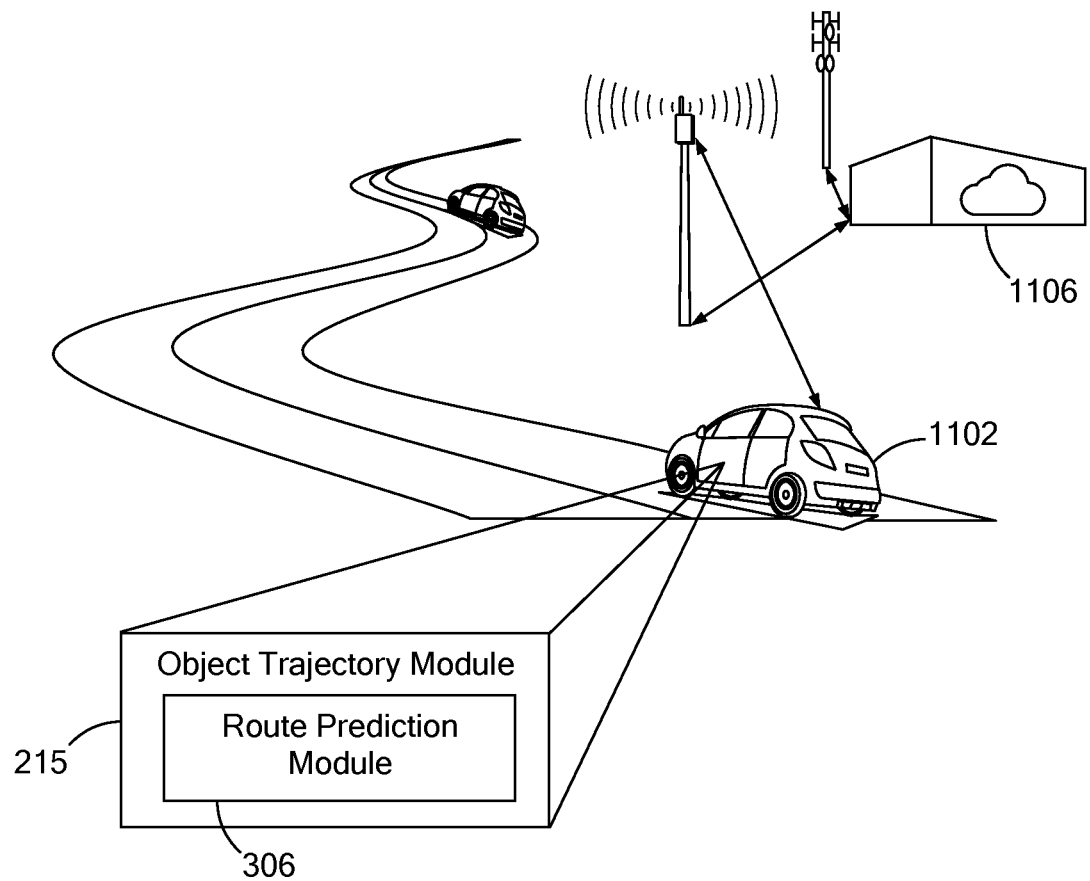
FIG. 11 illustrates a subject vehicle having the object trajectory module of the present disclosure exchanging data with a central datacenter in accordance with the present disclosure.

In one form, the route neural network 326 is a trained network that receives trained data from a central datacenter that analyzes historical data captured by the route prediction model 306. As an example, referring to FIG. 11, a subject vehicle 1102 is configured in a similar manner as the subject vehicle 100 and, thus, the object trajectory module 215 of the present disclosure. The subject vehicle 1102 exchanges data with a central datacenter 1106 by way of a wireless communication link. Particularly, the subject vehicle 1102 transmits measured state characteristics, future state characteristics, future trajectories, and estimated trajectories, among other information.

In one form, the central datacenter 1106 includes communication hardware such as transceivers, routers, and/or other components to communicate with subject vehicle 1102 and a controller having one or more microprocessors, memory (e.g., RAM, ROM, etc.) that stores computer readable instructions (i.e., software programs) executed by the microprocessor, and other suitable components such as a data repository with one or more databases, and/or server. The central datacenter operates as a machine learning center to analyzes data from the subject vehicle 1102 and/or other vehicles to generate trained data used by the route neural network 326.

Figure 12:
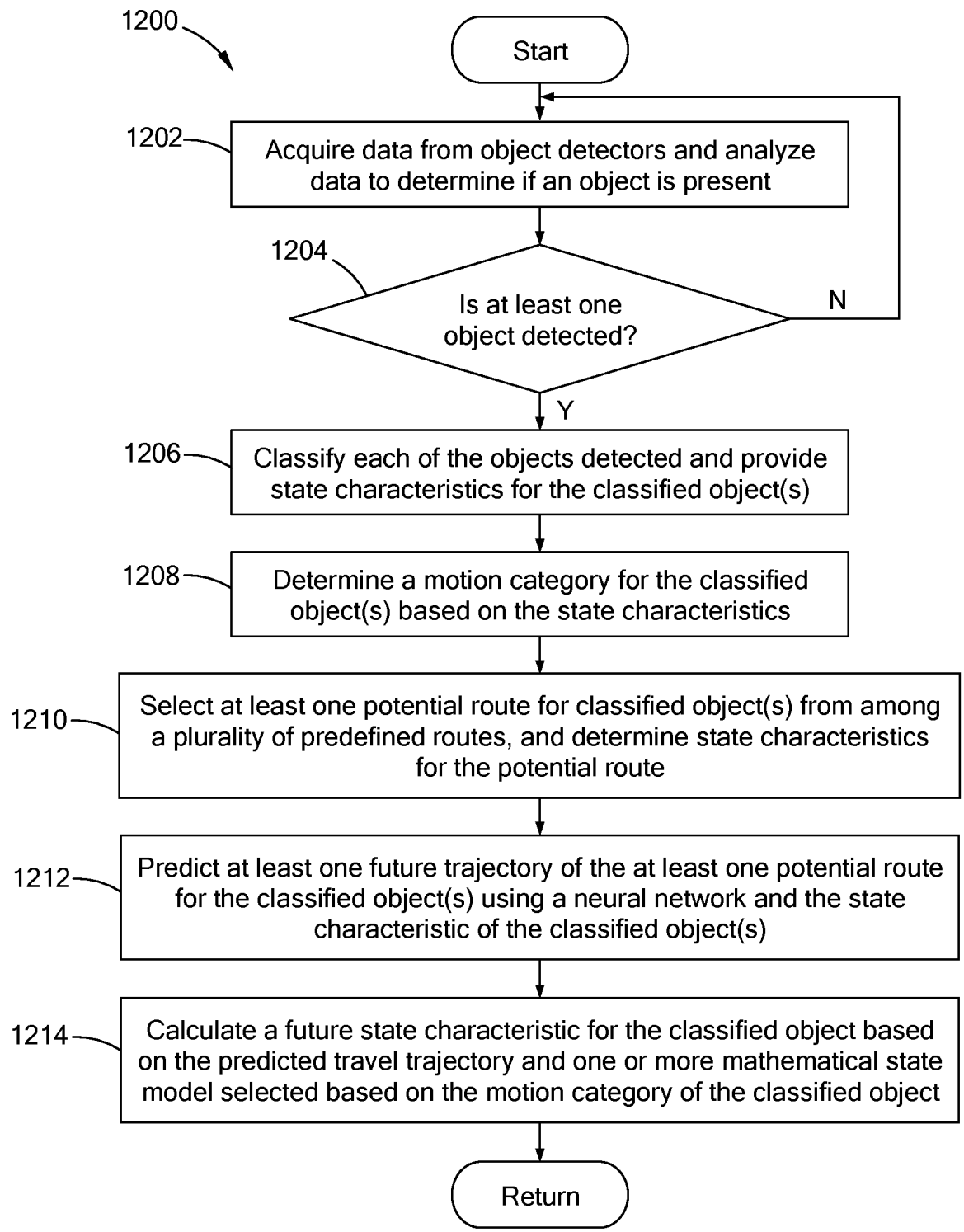
FIG. 12 is a flowchart for an object trajectory routine in accordance with the present disclosure.

Referring to FIG. 12, an example object trajectory routine 1200 is provided. This routine is performed by a controller programmed to include the operation of the object trajectory module of the present disclosure. The routine 1200 may be executed when, for example, the subject vehicle is turned on and an autonomous control is activated, and the routine may end when, for example, the subject vehicle is turned off or the autonomous control is deactivated. Details and/or examples regarding each of the steps is provided above.

At 702, the controller acquires data from the object detectors and analyzes the data to determine if an object is present. At 704, the controller determines if at least one object is detected. If not, the module returns to the beginning of the routine 1200. If at least one object is detected, the controller classifies each of the objects and provides state characteristics for each identified object, at 706, and determines a motion category for the classified object(s) based on the state characteristics.

At 1210, the controller selects at least one potential route from among a plurality of predefined routes for each of the classified objects and determines state characteristics for each potential route. At 1212, the controller predicts at least one future trajectory for each potential route for each classified object using a neural network and the state characteristic of the classified object(s). At 1214, the controller calculates one or more mathematical state models selected based on the motion category of the classified object.

It should be readily understood that the routine 1200 is just one example, and that other steps may be added and/or steps may be removed from the routine 1200. For example, objects may also be detected using basic safety messages from surrounding vehicles.

The object trajectory module of the present disclosure for a vehicle control system is a motion predication module that is configured to combine the mathematical model-based and AI-based methods for determining a trajectory of a moving object into a recurrent model. As provided above the AI-model (e.g., BRNN) is linked with the mathematical model to form a recurrent neural network to achieve continuous trajectory prediction. Moreover, occlusion due to a sensor's limited field of view is also addressed. That is, the object trajectory module is configured to handle the occlusion naturally by, for example, using previous measurements to determine future trajectory and updating the trajectory when the object is detected.

Based on the foregoing, the following provides a general overview of the present disclosure and is not a comprehensive summary.

In one the present disclosure is directed toward a method that includes: identifying a surrounding vehicle about a subject vehicle; obtaining a state characteristic for the surrounding vehicle; selecting at least one potential route for the surrounding vehicle, where the at least one potential route is selected from among a plurality of routes that are predefined; and recurrently performing a prediction analysis to acquire at least one future trajectory for the at least one potential route and a mathematical state analysis to calculate a future state characteristic for the surrounding vehicle based on the at least one future trajectory. The prediction analysis is based on a neural network and the at least one future trajectory for the at least one potential route is determined based on the state characteristic of the surrounding vehicle. A subsequent future travel trajectory for the at least one potential route is predicted based on the calculated future state characteristic.

In one variation, the state characteristic includes a position, a speed, a travel direction, an acceleration, or a combination thereof.

In another variation, the at least one potential route is selected based on a position of the surrounding vehicle along a road being travelled by the subject vehicle, and a distance between the surrounding vehicle and the subject vehicle.

In yet another variation, the detecting the surrounding vehicle is based on data from an object detector sensor disposed about the subject vehicle, a basic safety message transmitted by the surrounding vehicle, or a combination thereof.

In another variation, the state characteristic acquired when the surrounding vehicle is first identified is provided as an initial state characteristic, and the method further includes: sequentially acquiring subsequent state characteristics for the surrounding vehicle when the surrounding vehicle is identified subsequent to the initial detection; and storing the initial state characteristic and the subsequent state characteristic in a repository.

In yet another variation, subsequent to the initial detection, the at least one future trajectory is predicted using a current subsequent state characteristic in response to the surrounding vehicle being identified, and at least one of a previous subsequent state characteristic and the initial state characteristic in response to the surrounding vehicle not being identified.

In another variation, the neural network assigns a probability to the at least one future trajectory, and the method further includes controlling a drive operation of the subject vehicle based on the at least one future trajectory having a highest probability for the surrounding vehicle.

In yet another variation, the selecting the at least one potential route for the surrounding vehicle further includes: determining a travel lane of the surrounding vehicle based on a position of the surrounding vehicle; acquiring a distance between the subject vehicle and the surrounding vehicle; and selecting the at least one potential route based on the travel lane and the distance between the subject vehicle and the surrounding vehicle.

In another variation, the neural network is based on a Bayesian Neural Network.

In yet another variation, the method further includes: determining a motion category for the surrounding vehicle based on the state characteristic; and selecting at least one mathematical model from among a plurality of mathematical models based on the motion category. The at least one selected mathematical model is used for the mathematical state analysis to determine the future state characteristic for the surrounding vehicle.

In another variation, the plurality of mathematical models includes a constant speed model, a constant acceleration model, a constant jerk model, or a combination thereof.

In one form, the present disclosure is directed toward a controller that includes one or more memory storing a route repository that stores a plurality of predefined routes and includes one or more microprocessors configured to execute computer readable instructions to operate as an object analysis module, a route module, and a route prediction module. The object analysis module is configured to detect and classify a surrounding vehicle about a subject vehicle and to acquire a state characteristic of the surrounding vehicle in response to the surrounding vehicle being classified. The route module is configured to select at least one potential route for the surrounding vehicle. The potential route is selected from among the plurality of predefined route. The route prediction module is configured to recurrently perform a prediction analysis to acquire at least one future trajectory for the at least one potential route and a mathematical state analysis to calculate a future state characteristic for the surrounding vehicle based on the at least one future trajectory. The prediction analysis is based on a neural network and the at least one future trajectory is determined based on the state characteristic of the surrounding vehicle, and a subsequent future travel trajectory is predicted based on the calculated future state characteristic.

In one variation, the route module is configured to select the at least one potential route based on a position of the surrounding vehicle along a road being travelled by the subject vehicle, and a distance between the surrounding vehicle and the subject vehicle.

In another variation, the one or more memory includes an object classification repository that includes data indicative of a plurality of preidentified objects and a plurality of classifications associated with the plurality of preidentified objects. The object analysis module is configured to: detect an object by way of an object detector sensor disposed about the subject vehicle, a basic safety message transmitted by the surrounding vehicle, or a combination thereof, and classify the object based on data in the object classification repository in response to the object detector sensor detecting the object.

In yet another variation the state characteristic is acquired in response to an initial classification of the surrounding vehicle is provided as an initial state characteristic and as a subsequent state characteristic in response to a subsequent classification of the surrounding vehicle, and the route prediction module is configured to predict the at least one future trajectory using a current subsequent state characteristic in response to the surrounding vehicle being classified subsequent to the initial classification, and using at least one of a previous subsequent state characteristic and the initial state characteristic in response to the surrounding vehicle not being classified subsequent to the initial classification.

In another variation, the route module is configured to: determine a travel lane of the surrounding vehicle based on a position of the surrounding vehicle; acquire a distance between the subject vehicle and the surrounding vehicle; and select the at least one potential route from among the plurality of predefined routes based on the travel lane and the distance between the subject vehicle and the surrounding vehicle.

In yet another variation, the object analysis module is configured to determine a motion category for the surrounding vehicle based on the state characteristic, and the route prediction module is configured to select at least one mathematical model from among a plurality of mathematical models based on the motion category. The at least one selected mathematical model is used for the mathematical state analysis to determine the future state characteristic for the surrounding vehicle.

In another variation, the neural network is based on a Bayesian Neural Network.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:
identifying a surrounding vehicle about a subject vehicle;
obtaining a state characteristic for the surrounding vehicle;
selecting at least one potential route for the surrounding vehicle, wherein the at least one potential route is selected from among a plurality of routes that are predefined;
recurrently performing a prediction analysis to acquire at least one future trajectory for the at least one potential route and a mathematical state analysis to calculate a future state characteristic for the surrounding vehicle based on the at least one future trajectory, wherein:
the prediction analysis is based on a neural network and the at least one future trajectory for the at least one potential route is determined based on the state characteristic of the surrounding vehicle; and
a subsequent future travel trajectory for the at least one potential route is predicted based on the calculated future state characteristic.

2. The method of claim 1, wherein the state characteristic includes a position, a speed, a travel direction, an acceleration, or a combination thereof.

3. The method of claim 1, wherein the at least one potential route is selected based on a position of the surrounding vehicle along a road being travelled by the subject vehicle, and a distance between the surrounding vehicle and the subject vehicle.

4. The method of claim 1, wherein the detecting the surrounding vehicle is based on data from an object detector sensor disposed about the subject vehicle, a basic safety message transmitted by the surrounding vehicle, or a combination thereof.

5. The method of claim 1, wherein the state characteristic acquired when the surrounding vehicle is first identified is provided as an initial state characteristic, and the method further comprises:
sequentially acquiring subsequent state characteristics for the surrounding vehicle when the surrounding vehicle is identified subsequent to the initial detection; and
storing the initial state characteristic and the subsequent state characteristic in a repository.

6. The method of claim 5, wherein, subsequent to the initial detection, the at least one future trajectory is predicted using a current subsequent state characteristic in response to the surrounding vehicle being identified, and at least one of a previous subsequent state characteristic and the initial state characteristic in response to the surrounding vehicle not being identified.

7. The method of claim 1, wherein the neural network assigns a probability to the at least one future trajectory, and the method further comprising controlling a drive operation of the subject vehicle based on the at least one future trajectory having a highest probability for the surrounding vehicle.

8. The method of claim 1, wherein the selecting the at least one potential route for the surrounding vehicle further comprises:
  determining a travel lane of the surrounding vehicle based on a position of the surrounding vehicle;
  acquiring a distance between the subject vehicle and the surrounding vehicle; and
  selecting the at least one potential route based on the travel lane and the distance between the subject vehicle and the surrounding vehicle.

9. The method of claim 1, wherein the neural network is based on a Bayesian Neural Network.

10. The method of claim 1 further comprising:
  determining a motion category for the surrounding vehicle based on the state characteristic; and
  selecting at least one mathematical model from among a plurality of mathematical models based on the motion category, wherein the at least one selected mathematical model is used for the mathematical state analysis to determine the future state characteristic for the surrounding vehicle.

11. The method of claim 10, wherein the plurality of mathematical models includes a constant speed model, a constant acceleration model, a constant jerk model, or a combination thereof.

12. A controller comprising:
  one or more memory storing a route repository, wherein the route repository stores a plurality of predefined routes; and
  one or more microprocessors configured to execute computer readable instructions to operate as:
    an object analysis module configured to detect and classify a surrounding vehicle about a subject vehicle, wherein the object analysis module is configured to acquire a state characteristic of the surrounding vehicle in response to the surrounding vehicle being classified;
    a route module configured to select at least one potential route for the surrounding vehicle, wherein the potential route is selected from among the plurality of predefined route; and
    a route prediction module configured to recurrently perform a prediction analysis to acquire at least one future trajectory for the at least one potential route and a mathematical state analysis to calculate a future state characteristic for the surrounding vehicle based on the at least one future trajectory, wherein the prediction analysis is based on a neural network and the at least one future trajectory is determined based on the state characteristic of the surrounding vehicle, and a subsequent future travel trajectory is predicted based on the calculated future state characteristic.

13. The controller of claim 12, wherein the state characteristic includes a position, a speed, a travel direction, an acceleration, or a combination thereof.

14. The controller of claim 12, wherein the route module is configured to select the at least one potential route based on a position of the surrounding vehicle along a road being travelled by the subject vehicle, and a distance between the surrounding vehicle and the subject vehicle.

15. The controller of claim 12, wherein:
  the one or more memory includes an object classification repository that includes data indicative of a plurality of preidentified objects and a plurality of classifications associated with the plurality of preidentified objects;
  the object analysis module is configured to:
    detect an object by way of an object detector sensor disposed about the subject vehicle, a basic safety message transmitted by the surrounding vehicle, or a combination thereof, and
    classify the object based on data in the object classification repository in response to the object detector sensor detecting the object.

16. The controller of claim 12, wherein:
  the state characteristic acquired in response to an initial classification of the surrounding vehicle is provided as an initial state characteristic and as a subsequent state characteristic in response to a subsequent classification of the surrounding vehicle, and
  the route prediction module is configured to predict the at least one future trajectory using a current subsequent state characteristic in response to the surrounding vehicle being classified subsequent to the initial classification, and using at least one of a previous subsequent state characteristic and the initial state characteristic in response to the surrounding vehicle not being classified subsequent to the initial classification.

17. The controller of claim 12, wherein the route module is configured to:
  determine a travel lane of the surrounding vehicle based on a position of the surrounding vehicle;
  acquire a distance between the subject vehicle and the surrounding vehicle; and
  select the at least one potential route from among the plurality of predefined routes based on the travel lane and the distance between the subject vehicle and the surrounding vehicle.

18. The controller of claim 12, wherein:
  the object analysis module is configured to determine a motion category for the surrounding vehicle based on the state characteristic, and
  the route prediction module is configured to select at least one mathematical model from among a plurality of mathematical models based on the motion category, wherein the at least one selected mathematical model is used for the mathematical state analysis to determine the future state characteristic for the surrounding vehicle.

19. The controller of claim 18, wherein the plurality of mathematical models includes a constant speed model, a constant acceleration model, a constant jerk model, or a combination thereof.

20. The controller of claim 12, wherein the neural network is based on a Bayesian Neural Network.

* * * * *